United States Patent

[11] 3,573,736

[72] Inventor Hans P. Schlaeppi
Chappaqua, N.Y.

[21] Appl. No. 697,766
[22] Filed Jan. 15, 1968
[45] Patented Apr. 6, 1971
[73] Assignee International Business Machines Corporation
Armonk, N.Y.

[54] INTERRUPTION AND INTERLOCK ARRANGEMENT
3 Claims, 11 Drawing Figs.

[52] U.S. Cl. .......... 340/172.5
[51] Int. Cl. .......... G06f 9/18
[50] Field of Search .......... 340/172.5; 235/157

[56] References Cited

UNITED STATES PATENTS

| | | | |
|---|---|---|---|
| 3,398,405 | 8/1968 | Carlson et al. | 340/172.5 |
| 3,245,044 | 4/1966 | Meade et al. | 340/172.5 |
| 3,312,951 | 4/1967 | Hertz | 340/172.5 |
| 3,325,785 | 6/1967 | Stevens | 340/172.5 |
| 3,373,408 | 3/1968 | Ling | 340/172.5 |
| 3,405,394 | 10/1968 | Dirac | 340/172.5 |
| 3,412,382 | 11/1968 | Couleur et al. | 340/172.5 |
| 3,421,150 | 1/1969 | Quosig et al. | 340/172.5 |
| 3,377,624 | 4/1968 | Nelson et al. | 340/172.5 |

*Primary Examiner*—Paul J. Henon
*Assistant Examiner*—Harvey E. Springborn
*Attorneys*—Hanifin and Jancin and Isidore Match

ABSTRACT: A program control and interlock arrangement is shown wherein a chosen state of a given number of flag bits associated with data words processed by a first program are used to selectively activate one of several other programs whenever the first program encounters a data word in such chosen state, and which also permits in a multiprogrammed and/or multiprocessing system, the locking out of designated data sets from access by a second processor or process while it is still being accessed by a first processor. The signals which control the aforementioned locking out function are provided by the same data flag bits as those that control the activating of the above-mentioned other programs. These same flag bits may be employed to set and reset the interlock signals as appropriate for the lockout function to provide the mutual interlocking required to protect several concurrent processes from operating on the same data set.

INVENTOR
HANS P. SCHLAEPPI

BY Isidore Match

ATTORNEY

SUB ROUTINE "A"

INTERRUPTION AND INTERLOCK ARRANGEMENT

BACKGROUND OF THE INVENTION

This invention relates to systems for controlling interruption and interlocks in data processing systems. More particularly, it relates to a novel system for controlling interruption and interlocks which provides the advantages of improved speed and efficiency.

In the operation of multiprocessing systems, a fundamental requirement that has to be met is the capacity for effecting interlocks, i.e., the situation wherein a processor which is operating on a subset of the data that is accessible to several other processors may interdict the access of the other processors to such data subset. There are many known techniques for implementing such interlocks.

For example, in U.S. Pat. 3,245,044 to R. M. Meade et al., issued Apr. 5, 1966 and assigned to the International Business Machines Corporation, there is disclosed a system wherein secondary macroinstruction sequences or subroutines are inserted into the primary sequence of macroinstructions upon the occurrence of certain conditions, where both the nature of such conditions and that of the consequent subroutines are specified as parts of the primary instruction during the execution of which they may become effective.

In the important situation where several distinct processes, which may consist of distinct instances of processing activity as specified in the form of either one and the same or of several different procedures, concurrently progress by means of a program loop through one and the same array or data stream. However, the use of the aforementioned known techniques for preventing a successor procedure from accessing data that is still being operated upon by its predecessor procedure, usually requires the insertion of a number of instructions into the inner loop of each of these procedures. The need to insert such instructions which are not inherent in the algorithm proper can appreciably slow down the execution of the program which tends to defeat the purpose behind multiprocessing.

Further in this connection, programs operating on arrays or data streams frequently contain an inner loop in which there is a test for the occurrence of conditions that are rarely met. An example of such required testing is the detection of an array boundary. When such boundary is reached, the loop is left for some special program sequence. Another case in point is the aforementioned data interlock, a situation which is typically encountered in programming for a multiprocessing system in order to keep a processor from accessing data that has not yet been finished being operated upon by another processor. In this latter case, the interfering processor must be made to wait.

Both of the foregoing testing and interlock actions can, of course, be programmed by keeping track of suitably stepped index values and jumping to a special sequence whenever prescribed index bounds are reached. However, this programming approach requires the introduction of additional instructions and their concomitant fetch cycles into the inner loop of programs. In the latter case, a count- and-compare process that is completely extraneous to the algorithm proper must be introduced into the inner loop.

Accordingly, it is an important object of this invention to provide an interruption and interlock arrangement which removes from the inner loops of concurrent tasks the program sequences that index, count, compare, and then jump to the lockout control program.

It is another object to provide an arrangement wherein there is enabled the detection of array boundaries and the initiation of special procedures required on these boundaries without requiring the memory cycles and the instruction storage space which is inherent in the use of "branch on index" and "count," and "compare" sequences in the inner loops.

It is a further object to provide an arrangement in accordance with the preceding objects wherein the address of the a subroutine is stored with a data word rather than with an instruction whereby, when such data word is fetched during execution of any instruction, the subroutine so addressed will be activated.

SUMMARY OF THE INVENTION

In accordance with the invention, there is provided an interrupt and interlock arrangement in a data processing system comprising means for providing a data flag field to data words operated upon in the system, the flag field being capable of assuming a plurality of different states. There are included means for respectively associating discrete selected ones of these states with chosen specified programs. Means are further provided responsive to the fetching by a current program of a data word having a flag field state associated with one of the programs for interrupting the current program and transfering control from the current program to the aforesaid one specified program. There are also provided means responsive to the completion of the aforesaid one specified program for returning control from such last-named program to the interrupt control program. There are further included means for setting selected ones of the flag fields of the data words to predetermined ones of the flag field states for designating respective conditions of accessibility and inaccessibility for operation upon selected locations, means responsive to a second of the predetermined states of the flag field of the aforesaid one of the selected words to interdict operational access to the chosen designated location, and means responsive to the termination of the requirement of inaccessibility of the chosen designated location for changing the second state of the flag field to the first state.

Also, in accordance with the invention, there is provided an interruption and interlock arrangement for a data processing system in which instructions are executed and data words are operated upon, the data words being arranged in arrays that are subdivided into subarrays. The arrangement comprises means for designating chosen spaced data words in the arrays as boundary words for the subarrays. Means are included for providing a flag field for each of the data words, the flag field being capable of assuming a plurality of values or states. There are further provided means for setting the flag fields of a specified boundary word to a first state, this first state representing that the subarray preceding this boundary word is available to be operated upon. Means are also provided which are responsive to the taking up of operation on an available subarray for changing the first state of the flag field of the preceding boundary word of the taken up subarray to a second of the states, the second state of the flag field of a subarray preceding data word representing that the last-named array is not available to be worked upon. Means are also provided responsive to the change from unavailability to availability for operation upon a subarray for changing the flag field of the subarray from the second to the first state.

In addition, means are provided whereby a specified third, fourth, etc., state of the flag field of any data word can be associated with a first, second, etc., subprogram supplied by the user, which means are responsive to the detection of one of these flag states upon the fetching of a data word in effectively inserting a call of the corresponding subprogram into the primary program that fetched the flagged data word.

The hereinabove-mentioned flag field may comprise a number of bits $n$ to permit flag field states representing up to ($2^n$—a8) branch routines, one interdiction or interlock state and one "nonaction" state wherein the term "nonaction" signifies the absence of both interruption and interlock. Alternatively, the flag field may comprise $n$ bits to permit flag field states representing up to ($2^n$—1) branch routines and a "nonaction" state.

The foregoing and other objects, feature and advantages of the invention will be apparent from the following more particular description of a preferred embodiment of the invention, as illustrated in the accompanying drawings.

DESCRIPTION OF THE PREFERRED EMBODIMENT

Figure 1:
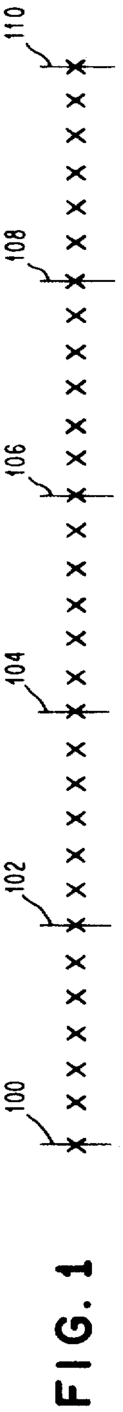
FIG. 1 is a conceptual depiction of an array of data words subdivided into subarrays with designated boundary words demarcating the subarrays.

Prior to considering the embodiment of the invention hereinafter described, there is first discussed how the invention is carried out. Essentially, the salient feature of the invention is the technique in which data-word flags or data-flag-states are employed. The underlying conceptual components are:

1. The employment of a data-flag or data-flag-state to control the effective insertion of a programmer-specified instruction sequence immediately prior to the execution of the current instruction into the instruction stream being executed. In this employment, the recognition of a flag on the data word fetched by the current instruction results in actions equivalent to the calling of a closed, parameter-less subroutine associated by the programmer to that flag, immediately preceding the current instruction, the latter subroutine returning control to the instruction that had fetched the flagged data word. Such operation may be conveniently referred to as an "equivalent subroutine call," the latter operation being completely transparent to the main routine; i.e., after returning from the subroutine call, the registers, etc. of the processor are in exactly the same state as they were immediately prior to entry into the "subroutine."

2. The employment of a data-flag or data-flag-state for controlling interlocks which are imposed on the executed instruction stream by the programmer. In this latter connection, interlocks can be considered as operating on either instructions or on data words. The interlocking of instructions protects a program sequence from being entered into by more than one task. The interlocking on data words protects a data set from being operated upon by more than one task.

The task encountering a closed interlock (*a*) suppresses execution of the current instruction, (*b*) will not update its instruction counter, (*c*) will put itself into the "wait" state, and (*d*) links itself to the list of waiting tasks recording the name of the interlock that put it into the "wait" state. Then this task is taken off the processor, possibly after a certain interval of time, which may be a preset system parameter. Conversely, if the interlock, which has put one or more tasks into the "wait" state, is released by another task, the latter task will activate a mechanism which extracts the first task in the Waiting Task List that contains an interlock name identical to that of the interlock being released, and inserts it into the task queue, thus making it available to be carried on by a processor as soon as one becomes available.

3. The employment of distinct states of a flag field for controlling flag subroutine calls as well as interlocks. Since a blocked interlock and the execution of a subroutine called by a flag interrupt are mutually exclusive, they can be distinguished by distinct states or state-sets of a multibit quantity. Another state is reserved for the "no interrupt-no interlock" indication (unflagged data).

By using data word flag interruption, the number of instructions executed in many inner loops can be reduced, thereby speeding up the routines. By combining flag interruption with flag interlock, relatively simple and efficient methods become available for programming a function, such as the one where several processors in a multiprocessing system concurrently progress through one and the same data set. The latter mode of concurrent processing has been referred to as "vertical parallelism."

Reference is now made to the FIGS. 1—9 which depict one illustrative and preferred embodiment constructed in accordance with the principles of the invention. In FIG. 1, there is shown an example of an application of the invention. In this FIG., the x's represent an array of data words. Such array is assumed to be partitioned by distinguished data words positioned at regular intervals. The numerals 100, 102, 104, 106, 108, and 110 designate those distinguished words marking the boundaries between the subarrays so created. For example, let it be assumed the complete row of x's represents a matrix. More than one processor may be working concurrently on this matrix but it is not permissible for more than one processor to be working on any one row of the matrix. The aforementioned boundaries would mark the beginning of each row in the matrix. They are utilized to control the mechanism which prevents concurrent processes on any given row or subarray while permitting concurrent processing of distinct rows. This action will be referred to as "interlocking."

Figure 4:
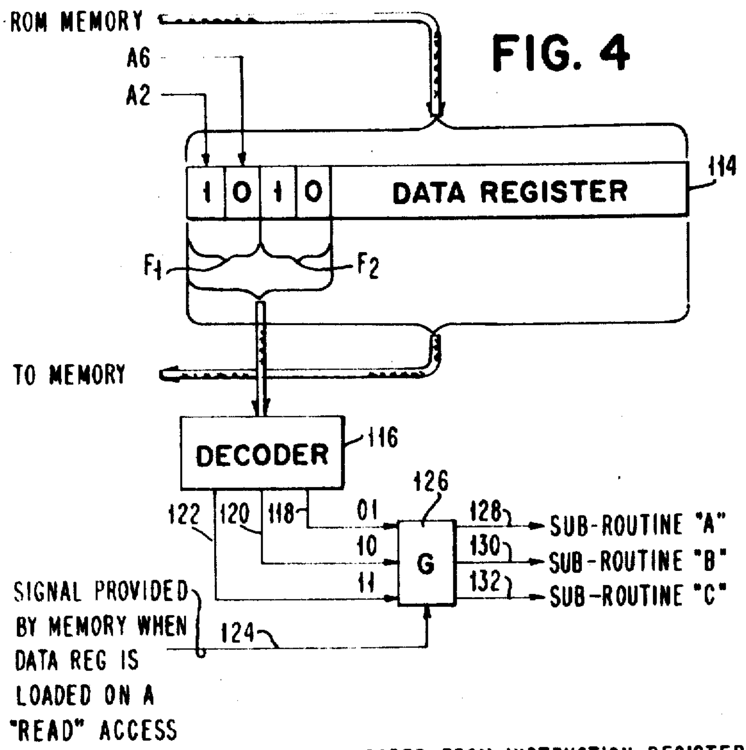
FIG. 4 is a depiction of an embodiment of the combination of the data register and flag field decoder suitable for use in the invention.
Figure 5:
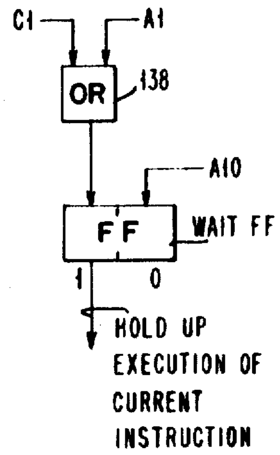
FIG. 5 is a diagram of a portion of the means suitable for use in the invention in the "hold up execution of current instruction" operation.
Figure 6:
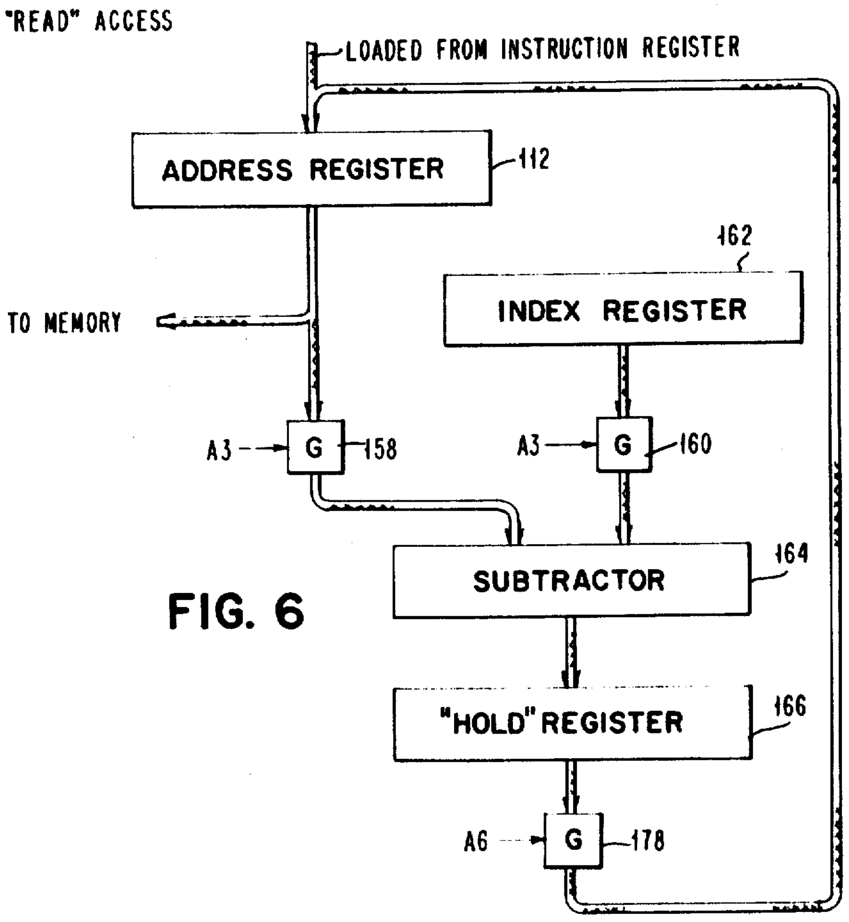
FIG. 6 is a diagram of an embodiment of suitable interrelated registers suitable for use in the invention.

FIGS. 4, 5 and 6 are respectively diagrams of structures of one of a of processors which may share a common memory. The address of the data word which is required in order to execute an instruction being suitably loaded into an address register 112 by conventional means not shown, the address of the word being provided from the instruction register in the processor. Of course, it is realized that, in the normal operation of the processor, a memory access is requested (means not shown) at the time that register 112 is loaded. When the data returns from this memory location, it is placed in a data register 114 (FIG. 4). It is to be noted that the data register 114 contains flag bits $F_1$ and $F_2$, in addition to a data field, the flag bits being decoded in a decoder 116 (FIG. 4). If the flag bits $F_1$ and $F_2$ are both in their 0 states, they are not detected by decoder 116. If flag bits $F_1$ and $F_2$ are in the 01 states, a line 118 consequently becomes active. If the flag bits $F_1$ and $F_2$ are in the 10 state, a line 120 becomes active. If the flag bits $F_1$ and $F_2$ are in the 11 state, line 122 becomes active.

After data register 114 has been loaded as a consequence of a "read" access operation, the memory accessed by the processor provides a signal on line 124 (by means not shown) which is applied to a gate 126 (FIG. 4) in order to test for the active state of one of lines 118, 120 or 122. If any of lines 128, 130 or 132 becomes active as a result of the latter test, the program of which the current instruction is part will be interrupted before this current instruction is actually executed, and one of three subroutines, suitably designated A, B, and C, will be entered into. Upon completion of this subroutine, the original program will resume with a reentry of the instruction at which the interruption occurred. If line 128 had become active, subroutine A will be initiated. If line 130 had become active, then subroutine B will be started. If line 132 had become active, then subroutine C will be started. It is to be noted that the active state of line 128 initiates the operation of the A clock (FIG. 3) and that line 132 starts the operation of the "C" clock (FIG. 2).

Figure 2:
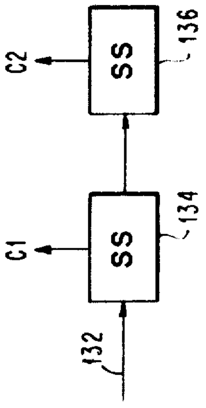
FIG. 2 is a block diagram of a clock employed in an embodiment of a microprogram which the arrangement according to the invention is capable of executing.
Figure 3:
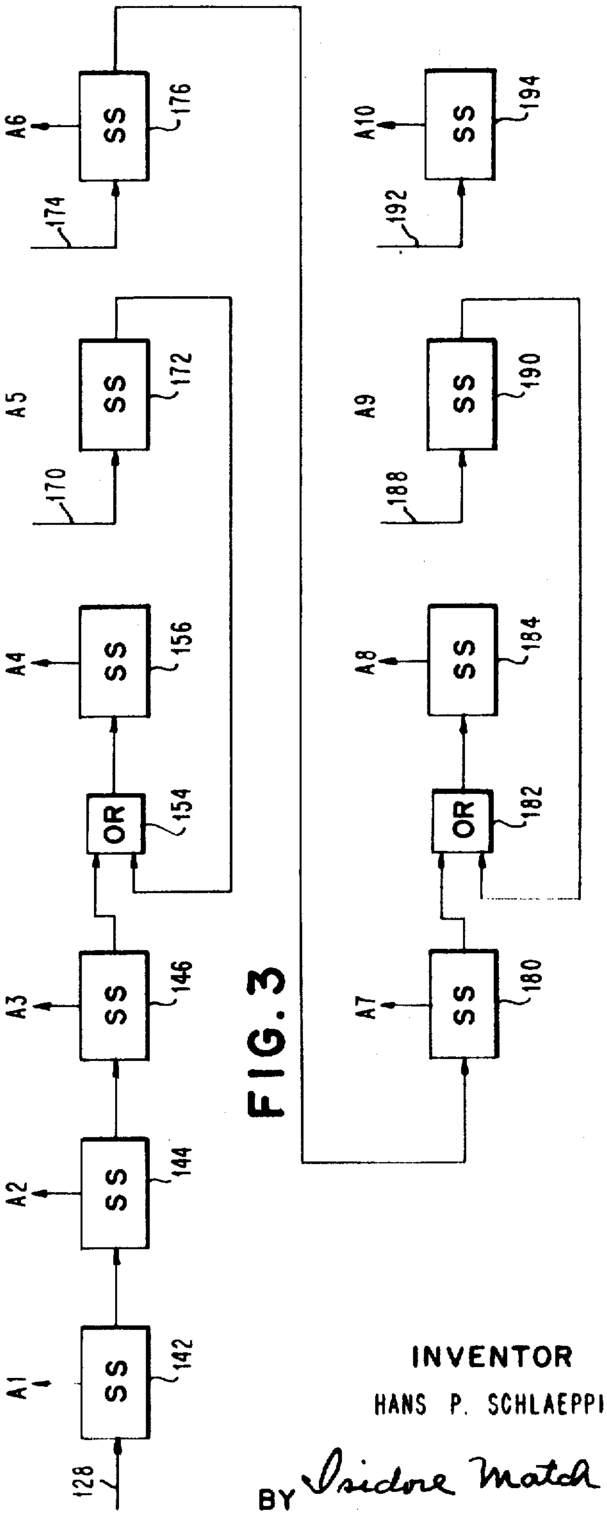
FIG. 3 is a block diagram of another clock employed in another embodiment of a mircroprogram which the arrangement is capable of executing.

Referring to FIG. 2 and FIG. 3, the essential components of the C and A clocks are monostable multivibrator stages respectively legended SS. The C clock comprises monostable multivibrators 134 and 136 and the A clock comprises monostable multivibrators 142, 144, and 146; OR circuit 154, monostable multivibrators 156, 172, 176 and 180; OR circuit 182; and monostable multivibrators 184, 190 and 194. The C and the A clocks are so constructed whereby upon the termination of the astable state of monostable multivibrator, the succeeding multivibrator in the clock is switched to its astable state.

As has been stated hereinabove, the boundaries designated by the numerals 100—110 in FIG. 1 are utilized to control the mechanism which effects lockouts. These boundaries can be indicated by the states of the flag bits $F_1$ and $F_2$ in data register 114 (FIG. 4). Thus, in operation, the flag bits for the boundaries could initially be set to the 01 state and the data words intermediate the respective boundaries would have their flag bits set to the 00 state. When a processor begins to work on a subarray, it would be desired that all other processors be locked out from working on that same subarray, the lockout that stopped a processor temporarily upon recognizing flag bits of a data word set a being in the 11 state. Thus, if it is assumed that a processor is working on the subarray between boundaries 104 and 106 (FIG. 1), once it would encounter boundary 106, it would detect flag bits in the 01 state. Before starting to work on location 106 and those following it, it would be desired to set the flag bits for this particular data word to the 11 state in order to lock out other processors from following it into the subarray between boundaries 106 and 108. After the setting of the flag bits for the data word 106 to the 11 state, it would be desired to set the flag bits of data word 104 to the 01 state in order to permit another processor to work on the subarray between boundaries 104 and 106. The subroutine A accomplishes the immediately before mentioned objectives. It is activated when the flag bit combination 01 is encountered. If a processor were to encounter the flag bits in the state 11, then it would know that it has to wait until these flag bits are set to the 01 state. The subroutine which effects the latter operation is shown as subroutine C.

Figure 7:
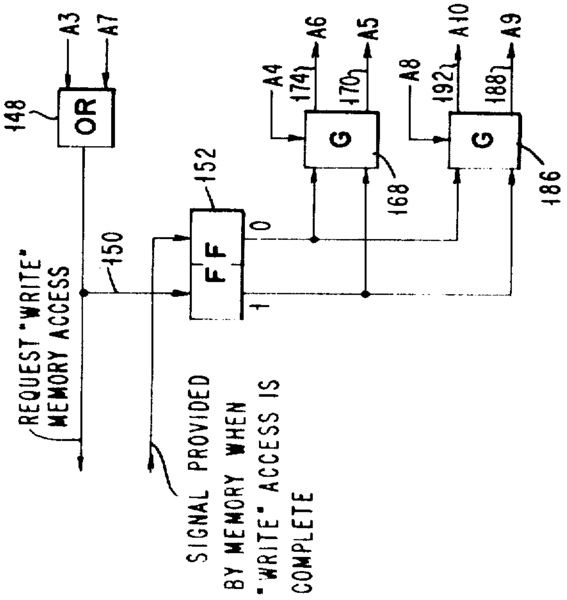
FIG. 7 shows a portion of the circuitry suitable for use in one of the microprograms capable of being executed by the invention.
Figure 8:
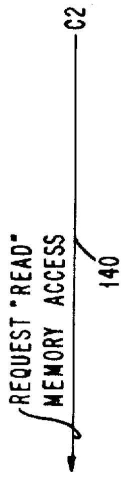
FIG. 8 is a depiction of the "read memory access" operation in one of the microprograms capable of being executed by the invention.

There is now first described subroutine C In this connection, it is to be noted that when line 132 (FIG. 4) becomes active, monostable multivibrator 134 in the C clock (FIG. 2) is switched to its astable state to produce a C1 pulse. Pulse C1 is applied to OR circuit 138 (FIG. 5) to switch the flip-flop legended "wait" to its 1 state. When the "wait" flip-flop is in its 1 state, it holds up the execution of the current instruction which is in the instruction register. When monostable multivibrator 134 reverts to its stable state, monostable multivibrator 136 in the C clock is switched to its astable state to produce the pulse C2. Pulse C2 is applied to line 140 (FIG. 8) in order to request a "read" memory access. When data register 114 is loaded, the memory provides a signal on line 124 (FIG. 4). If the flag bits of data register 114, viz. bits $F_1$ and $F_2$, are still in the 11 state, the processor again branches to subroutine C and merely repeats the memory fetch. When the flag bits have been set to the 01 state, as is further described hereinafter in connection with the description of subroutine A, such change of state of the flag bits is detected by the processor which is waiting and the processor will then branch to subroutine A. When the latter branching occurs, line 128 (FIG. 4) becomes active to switch to its astable state monostable multivibrator 142 in the A clock (FIG. 3). The resulting pulse A1 astable output of monostable multivibrator 142 is applied to OR circuit 138 (FIG. 5) in order to set the "wait" flip-flop to its 1 state. Thus, as mentioned hereinabove, the execution of the current instruction is held up. When monostable multivibrator 142 reverts to its stable state, it switches monostable multivibrator 144 to its astable state to consequently produce the A2 pulse output from monostable multivibrator 144. Pulse A2 sets the $F_1$ flag bit in data register 114 to its 1 state. Again, when monostable multivibrator 144 reverts to its stable state, it switches to its astable state monostable multivibrator 146 to produce the A3 pulse output. Pulse A3 is applied to OR circuit 148 in order to request a write memory access (FIG. 7). Pulse A3 is also applied trough a line 150 to set a flip-flop 152 (FIG. 7) to its 1 state. Pulse A3 is further applied to a gate 158 and a gate 160 in order to gate the contents of address register 112 (FIG. 6) and the contents of the index register 162 to a subtractor 164. In subtractor 164, the contents of register 162 are subtracted from the contents of register 112. The results of such subtraction are then entered into a "hold" register 166. The contents of index register 162 is the number which must be subtracted from one boundary address in order to produce the preceding boundary address. For example, if the address of the data at boundary 106 in FIG. 1 is in register 112, then in order to find the address at boundary 104, the contents of register 162 must be subtracted from the contents of register 112.

When monostable multivibrator 146 reverts to its stable state, monostable multivibrator 156 is switched to its astable state through OR circuit 154 to produce the A4 pulse. Pulse A4 is employed to test a gate 168 (FIG. 7) which in turn tests the condition of flip-flop 152. If the"write" access is complete, flip-flop 152 will be in its 0 state which will permit the A clock to branch to monostable multivibrator 176 via a line 174 to thereby produce the A6 pulse. However, if the "-write" access is not complete, then flip-flop 152 will be in its 1 state and monostable multivibrator 172 will be switched to its astable state by the active state of line 170 to produce the A5 pulse, the latter pulse being employed for delay purposes only. In such situation, when monostable multivibrator 172 reverts to its stable state, a pulse will be delivered through OR circuit 154 in order to again switch monostable multivibrator 156 to its astable state. If the memory access is complete, line 174 will become active, line 174, as having been mentioned hereinabove being employed to switch multivibrator 176 to its astable state to produce the A6 pulse which is employed to set the $F_1$ bit of data register 114 (FIG. 4) to its 0 state. Pulse A6 is also applied to a gate 178 (FIG. 6) to gate the contents of register 166 to register 112.

When monostable multivibrator 176 reverts to its stable state, it switches monostable multivibrator 180 in the A clock to produce the A7 pulse. Pulse A7 is applied to an OR circuit 148 in order to request a "write" memory access and also to set flip-flop 152 to its 1 state. When monostable multivibrator 180 reverts to its stable state, it switches monostable multivibrator 184 through OR circuit 182 to its astable state to thereby produce the A8 pulse. Pulse A8 is applied to a gate 186 (FIG. 7) in order to test the condition of flip-flop 152. If the memory access is not complete, a line 188 becomes active, line 188 being employed to switch to its astable state monostable multivibrator 190 in the A clock. Monostable multivibrator 190 is employed for delay only and, when it reverts to its stable state, it switches monostable multivibrator 184 to its astable state in order to repeat the test. If the memory access is complete, then a line 192 becomes active. Line 192 is utilized to switch to its astable state monostable multivibrator 194 to produce the A10 pulse. Pulse A10 is employed to set the "-wait" flip-flop to its 0 state. The processor then proceeds with the execution of the current instruction.

Figure 9:
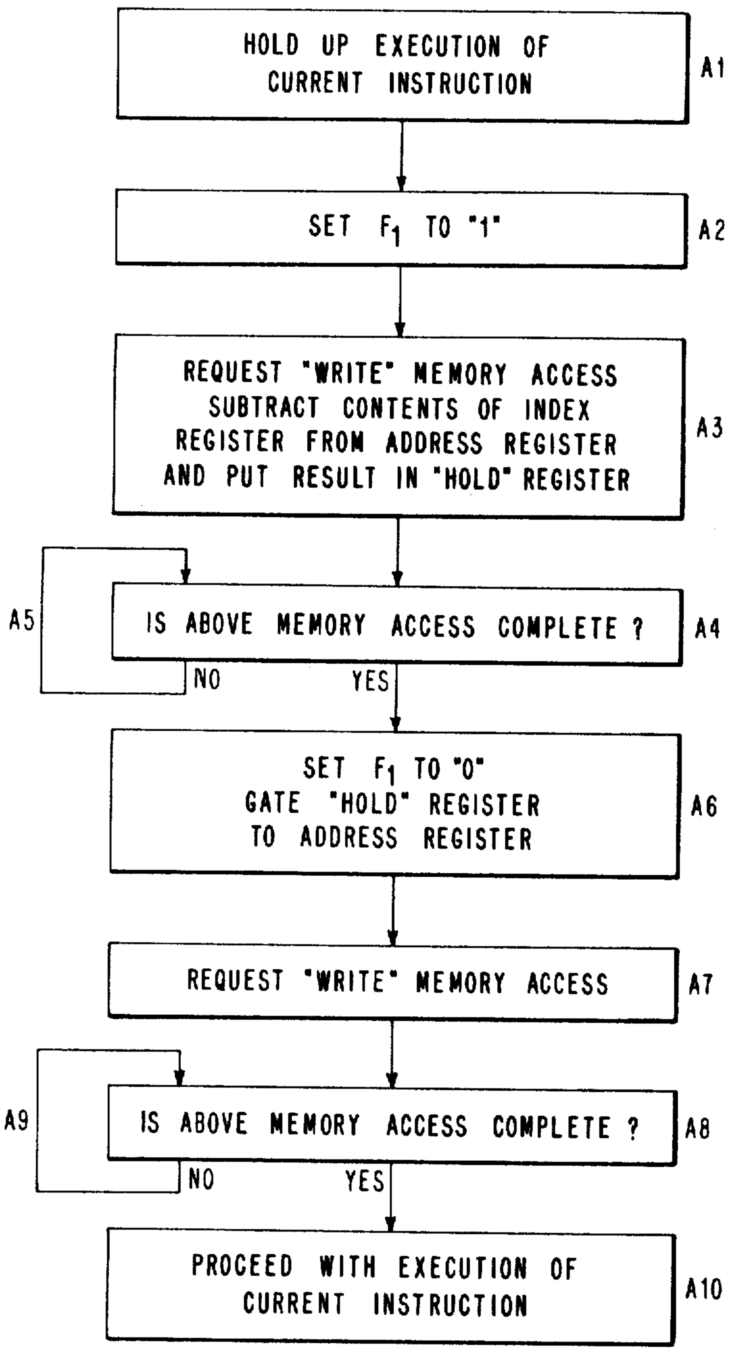
FIG. 9 is a flow diagram of a microprogram capable of being executed according to the invention.

In FIG. 9 there is shown a flow chart of the subroutine A microprogram.

Figure 11:
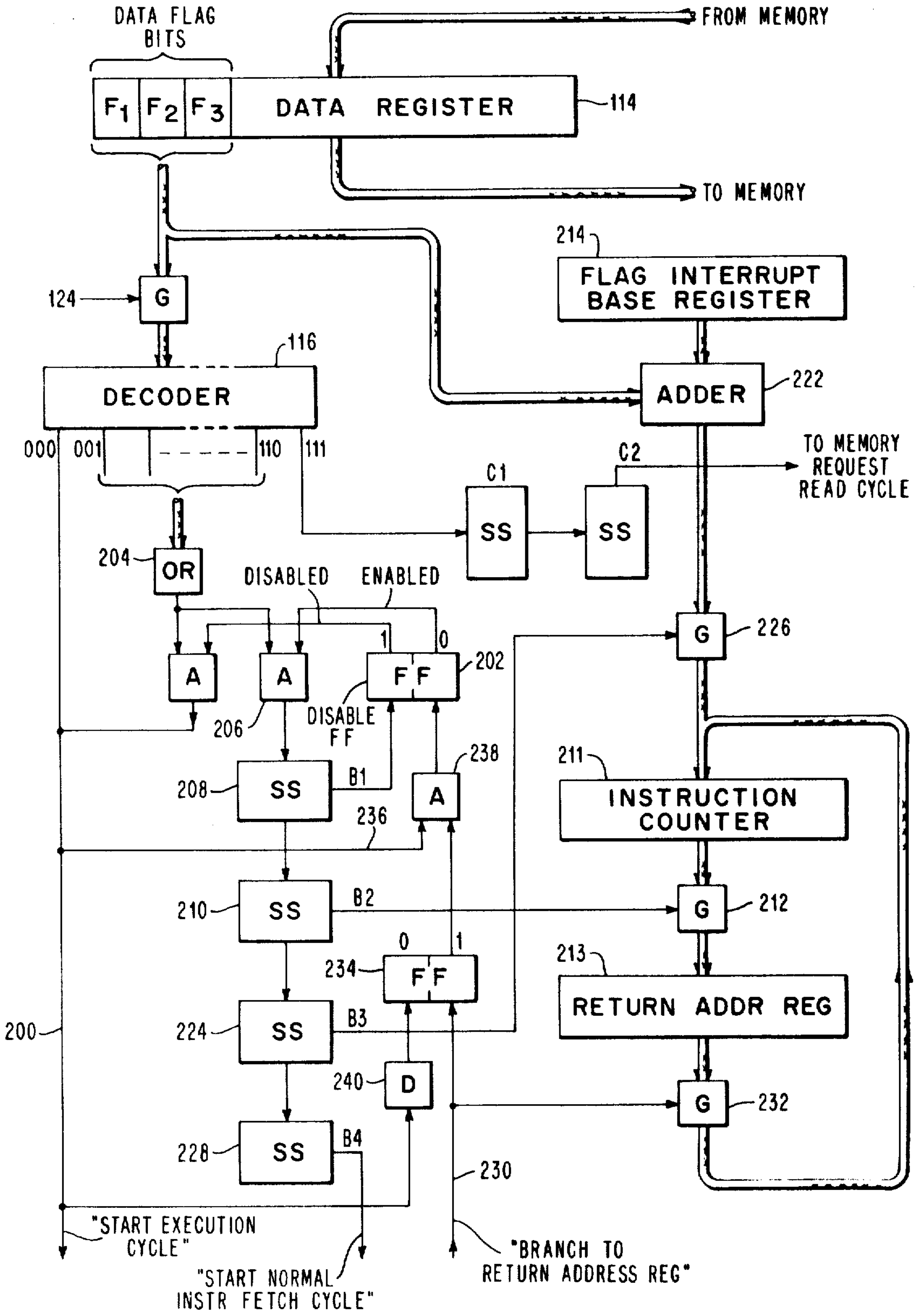
FIG. 11 shows another embodiment of an arrangement constructed in accordance with the principles of the invention.

Reference is now made to FIG. 11 wherein there is depicted another embodiment constructed in accordance with the principles of the invention. In FIG. 11, the data register 114 is essentially similar to that shown in FIG. 4 with the difference that data register 114 of FIG. 11 includes a third flag bit $F_3$. Those structures depicted in FIG. 11 which correspond to those in the other FIGS. have been given the same designating numerals.

In considering the operation of the arrangement shown in FIG. 11, if the flag bits of data register 114, viz., bits $F_1$, $F_2$, and $F_3$, are in the 000 state when they are decoded, a line 200 is activated to provide a signal to the execution mechanism and effect the commencement of an execution cycle. If flag bits $F_1$, $F_2$ and $F_3$ are in the 111 state, the C routine as described in connection with FIGS. 1—9 is started. A "disable" flip-flop 202 is included in the arrangement shown in FIG. 11 which is initially in the reset state.

If flag bits $F_1$, $F_2$ and $F_3$ when decoded are in any one of the states 001 through 110, an OR circuit 204 produces an output which passes through an AND circuit 206 to switch a monostable multivibrator 208 to its astable state to produce a B1 pulse output. The B1 pulse from monostable multivibrator 208 will switch flip-flop 202 to its set state, which will be seen to result in the disabling of the flag interruption mechanism. When monostable multivibrator 208 reverts to its stable state, it switches a monostable multivibrator 210 to its astable state to produce the B2 pulse output therefrom which is applied to a gate 212 in order to gate the contents of the instruction counter 211 to the return address register 213. A register legended the "flag interrupt base register" 214 is provided and is loaded by a program means (not shown). Register 214 contains the base address for several of a table of branch instructions, each being effective in transferring control to an associated subroutine. Thus, in order to initiate one of these subroutines, the address of the corresponding location in the flag interrupt table must be inserted into the instruction counter. In the arrangement shown in FIG. 11, where the three flag bits $F_1$, $F_2$, $F_3$ are provided in data register 114 and the flag states 001 through 110 are associated with routines, the contents of register 214, when added to the value of the three flag bits, can give six possible subroutine starting addresses.

Figure 10:
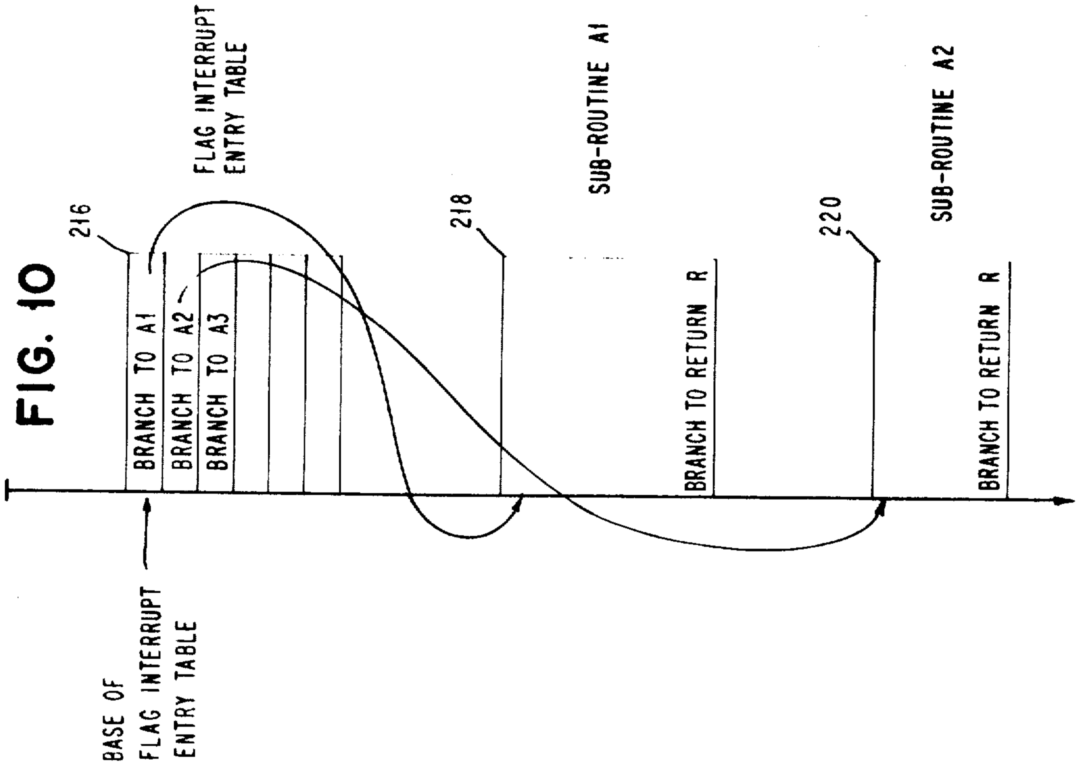
FIG. 10 is a flow-type diagram of some of the routines of which another embodiment of the invention is capable.

Referring now to FIG. 10, which partially represents the memory layout as might be employed in using this embodiment, there is shown the "flag interrupt entry table," designated with the numeral 216, containing three of the six possible entry instructions. The first of the subroutines designated A1 is indicated by the box 218 and the second of these subroutines designated A2 is represented by the box designated 220.

Referring back to FIG. 11, when monostable multivibrator 210 reverts to its stable state, it switches a monostable multivibrator 224 to its astable state to produce the B3 pulse. Pulse B3 is applied to a gate 226 in order to gate the output of an adder 222 into the instruction counter 211. In adder 222, there is added the value of the flag bits to the base address which is contained in flag interrupt base register 214. When monostable multivibrator 224 reverts to its stable state, it switches a monostable multivibrator 228 to its astable state to produce the B4 pulse which is sent to the instruction mechanism to inform it to start a normal instruction fetch cycle. The instruction fetched will branch instructions from table 216 (FIG. 10) whose address is now residing in the instruction counter 211. Execution of this branch instruction will cause control to enter the proper subroutine. In every subroutine to be entered by the flag interrupt mechanism, the last instruction must be a "branch to return register." The execution of this particular instruction will cause a pulse to appear on a line 230, FIG. 11. The latter pulse will cause a flip-flop 234 to be set to its 1 state and will also be applied to a gate 232 in order to gate the contents of return address register 213 to instruction counter 211. This operation will eventually cause the instruction during which the interrupt occurred to be repeated. During this repeat, however, when the flag bits are decoded by the pulse on line 124, line 200 will be activated because flip-flop 202 is still set as a record of the interrupt that is about to terminate. Thus, the signal representing the recognition of a data flag will be gated from OR circuit 204 through AND circuit 205 to line 200, thereby initiating a normal execution cycle. Furthermore, when the pulse appears on line 200, it will be delivered along a line 235, and through an AND circuit 238 to reset flip-flop 202 to its 1 state. The pulse on line 200 will be delayed by a delay unit 240, whereafter it will reset flip-flop 234 to its 0 state. By these combined actions, the mechanism reverts to its "enabled" state, resuming the execution of the interrupted instruction.

To summarize in the following, it is to be noted that in accordance with the invention effectively there is stored the address of a subroutine in conjunction with a data word rather than with an instruction. When such data word is fetched during execution of any instruction, the subroutine so addressed is activated. Such address has been denoted as a data flag. In the invention, one of $2^n$ possible values of the n-bit flag quantity. Associated with each data word, has been assigned to denote the existence of a closed interlock, i.e., upon the fetching of a data word carrying the flag with this particular value. Program execution is suspended until some other program changes the value of the flag in the same data word, thereby signalling the removal of the interlock that suspended the execution of a current program. Thereupon, execution of the current program is permitted to resume. Data flags are utilized as both subroutine addresses and interlocks to provide the advantages over the providing of separate flags for such purposes, i.e., one flag bit for signalling interlocks, and a separate multibit flag for specifying the subroutine address. Such joint use flows from the realization that a closed interlock precludes any processing activity at the point of the interlock, be it in the primary program or in a subroutine to be inserted. Thus, the use of a flag for inserting the subroutine and its use for signalling an interlock are mutually exclusive. Such exclusivity makes it possible to assign distinct values, i.e., states of one and the same field of flag bits to these distinct functions.

The invention is particularly advantageously used in multiprocessing systems where the innermost loops of many subroutines conventionally are burdened with the inclusion of organizational instructions required for synchronizing parallel branches of a computation. Although such organizational instructions in practice infrequently effect any change in memory, they nevertheless have to be fetched and executed upon every iteration of the loop thereby slowing the program appreciably without performing any substantially useful function. The elimination of these unproductive test instructions from high-speed loops is a salient advantage that flows from the use of the invention.

While the invention has been particularly shown and described with reference to preferred embodiments thereof, it will be understood by those skilled in the art that the foregoing and other changes in form and details may be made therein without departing from the spirit and scope of the invention.

I claim:

1. An interrupt and interlock device in a data processing system comprising:
   - means for providing a data flag field to data words operated upon in said system, said flag field being capable of assuming a plurality of different states;
   - means for respectively associating discrete selected ones of said states with chosen specified programs;
   - means responsive to the fetching by a current program of data word having a flag field state associated with one of said specified programs for interrupting said current program and transferring control from said current program to said one specified program;
   - means responsive to the completion of said one specified program for returning control from said last-named program to said interrupted control program;
   - means for setting selected ones of the flag fields of said data words to predetermined ones of said states for designating respective conditions of accessibility and inaccessibility for operation upon selected locations;
   - means responsive to a first of said predetermined states of the flag field of one of said selected words for permitting operational accessibility to a chosen one of said designated locations; and means responsive to a second of said predetermined states of the flag field of said one of said selected words for interdicting operational access to said chosen designated location.

2. In a data processing system having a plurality of active components and which functions to execute instructions and operate on data words, said data words being arranged in arrays that are subdivided into subarrays, an interruption and interlock device for said system comprising:

means for designating chosen spaced data words in said arrays as boundary data words for said subarrays;

means for providing a flag field for each of said data words, said flag field for each of said data words, said being capable of assuming a plurality of states;

means for setting the flag fields of said boundary words to a first of said states, said first binary state of a flag field of a boundary word preceding a given subarray signifying that said last-named subarray is available to be operated upon; and means responsive to the taking up of operation on said available subarray by one of said components for changing said first binary state of the flag field of the preceding boundary word of the taken up subarray to a second of said binary states, the second binary state of the flag field of a subarray preceding binary word signifying that said last-named subarray is not available to be operated on by the others of said components.

3. In a processing system as defined in claim 2 and further including means for setting said flag field of said boundary words to states other than said first and second states, said other binary states individually representing different branch routines; and means responsive to said other states' flag field settings of said boundary words for carrying out the corresponding branch routines.

PO-1050
(5/69)

UNITED STATES PATENT OFFICE
CERTIFICATE OF CORRECTION

Patent No. 3,573,736 Dated April 6, 1971

Inventor(s) Hans P. Schlaeppi

It is certified that error appears in the above-identified patent and that said Letters Patent are hereby corrected as shown below:

| | |
|---|---|
| Col. 2, line 68 | Correct "$(2^n-a8)$" to -- $(2^n-2)$ -- |
| Col. 2, line 74 | Correct "feature" to -- features -- |
| Col. 4, line 35 | After "assumed" insert -- that -- |
| Col. 4, line 46 | After "a" (first instance) insert -- plurality -- |
| Col. 5, line 29 | Correct "a" (second instance) to -- as -- |
| Col. 6, line 39 | After "174" insert -- , -- |
| Col. 8, line 1 | Correct "1" to -- "0" -- |
| Col. 9, line 13 | Delete "for each of said data words, said" |

Signed and sealed this 19th day of December 1972.

(SEAL)
Attest:

EDWARD M.FLETCHER,JR.
Attesting Officer

ROBERT GOTTSCHALK
Commissioner of Patents